INVENTOR.
R.J. SPITZNAGEL
BY *Young and Quigg*
ATTORNEYS

May 18, 1971  R. J. SPITZNAGEL  3,579,404
CUTTING AND SEALING UNIT
Filed March 6, 1969  3 Sheets-Sheet 3
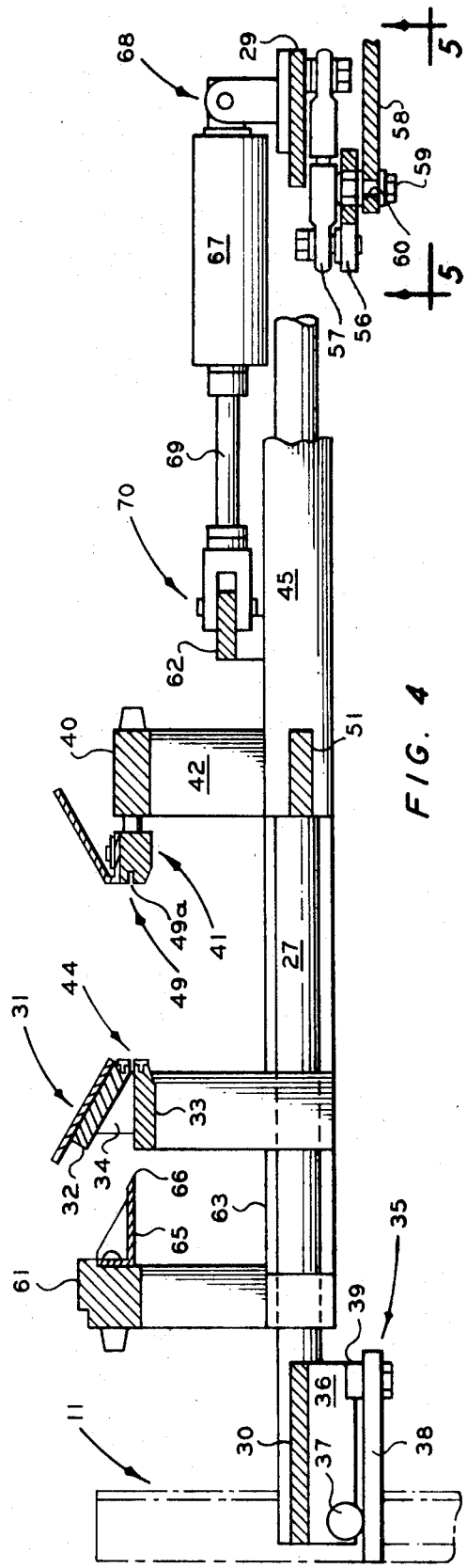
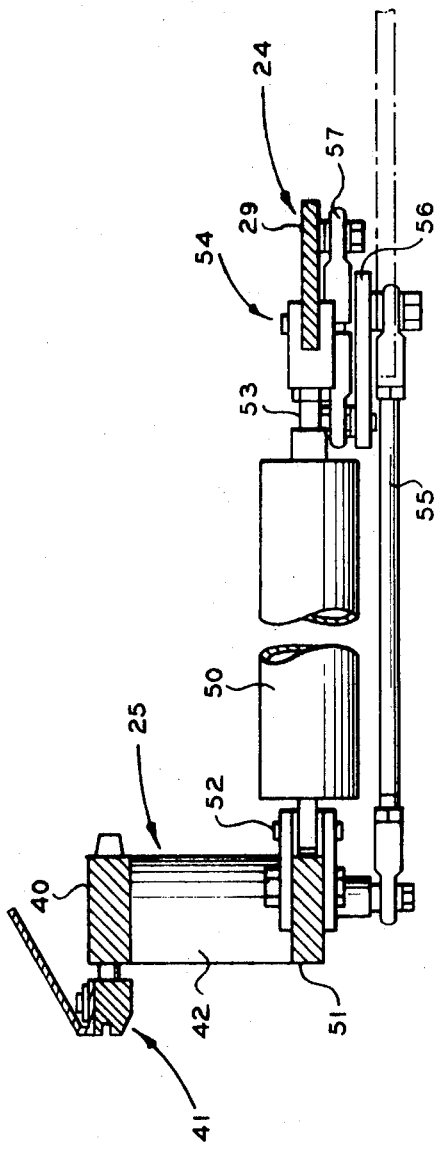
INVENTOR.
R. J. SPITZNAGEL
BY *Young and Quigg*
ATTORNEYS United States Patent Office 3,579,404
Patented May 18, 1971

3,579,404
CUTTING AND SEALING UNIT
Robert J. Spitznagel, Cincinnati, Ohio, assignor to
Phillips Petroleum Company
Filed Mar. 6, 1969, Ser. No. 804,846
Int. Cl. B32b 31/20; B65b 51/14, 51/30
U.S. Cl. 156—515                                    5 Claims

ABSTRACT OF THE DISCLOSURE

A cutting and sealing unit for plastic packaging machines. The unit comprises three relatively movable frames, two of which include gripping jaws and the third, a heat sealing and cutting knife.

BACKGROUND AND SUMMARY OF THE INVENTION

This invention relates to combined bagging and packaging machines. In one aspect the invention relates to an improved sealing and cutting apparatus for machines designed to package products in thermoplastic film.

Bagging and packaging machines of the general type considered herein are designed to progressively advance continuous, open-end, centerfold film of thermoplastic material from a stock roll to a packaging position. After the article to be packaged is placed in the open side of the film, an assembly is actuated to heat seal the open sides of the film and to sever the packaged article from the continuous film stock, the sealing and severing steps occurring in a single operation of the assembly.

The assembly for performing the sealing and cutting steps comprises two interrelated subassemblies: a pair of gripping jaws for securing the film, and a heated knife for simultaneously cutting and welding the thermoplastic film. Conventionally, the subassemblies are mounted on the main chassis of the machine and are provided with power means for moving the subassemblies in timed relation. The power means include such devices as rack and pinion, endless chain assembly, hydraulic cylinders, and combinations thereof. The separate subassemblies were generally independently and movably mounted on the main chassis.

Frequently, it becomes necessary to replace either the heated knife or the gripping jaws. In the presently known bagging and packaging machines, this involves a considerable amount of time-consuming labor resulting in long shutdown periods. The subassemblies must be disassembled and removed from the main chassis and the replacement subassembly substituted therefor. Following reassemblage of the parts, the movable parts must be carefully adjusted to provide for the coordinated operation.

The purpose of the present invention is to provide a bagging and packaging machine with a unitized sealing and cutting unit which can conveniently be replaced by a similar unit. Thus, when repairs are required, the unitized assembly is simply lifted from the main chassis and replaced by another unitized assembly. Accordingly, it is an object of this invention to minimize shutdown time of a bagging and packaging machine during repairs, and to simplify adjustment of the correlated parts of the cutting and sealing assembly.

The unitized assembly comprises three relatively movable frames: a first jaw frame; a second jaw frame; and a cutting and sealing element frame. The frames are fabricated in a unitary assembly which fits on a receiving platform formed in the main chassis. Power means for the frames are carried on the unitized structure so that the entire assembly may be removed as a unit from the chassis. The only connection to the main chassis is a pivot pin which locates the reaction base on the chassis so that the frames maintain the proper relationship with the advancing film.

DRAWINGS

FIG. 3 is a sectional view of the cutting and sealing assembly, the cutting plane taken generally along the line indicated by 3—3 of FIG. 2;

FIG. 4 is a sectional view of the cutting and sealing assembly, the cutting plane taken generally along the line indicated by 4—4 of FIG. 2.

DESCRIPTION OF THE PREFERRED EMBODIMENT

Figure 1:
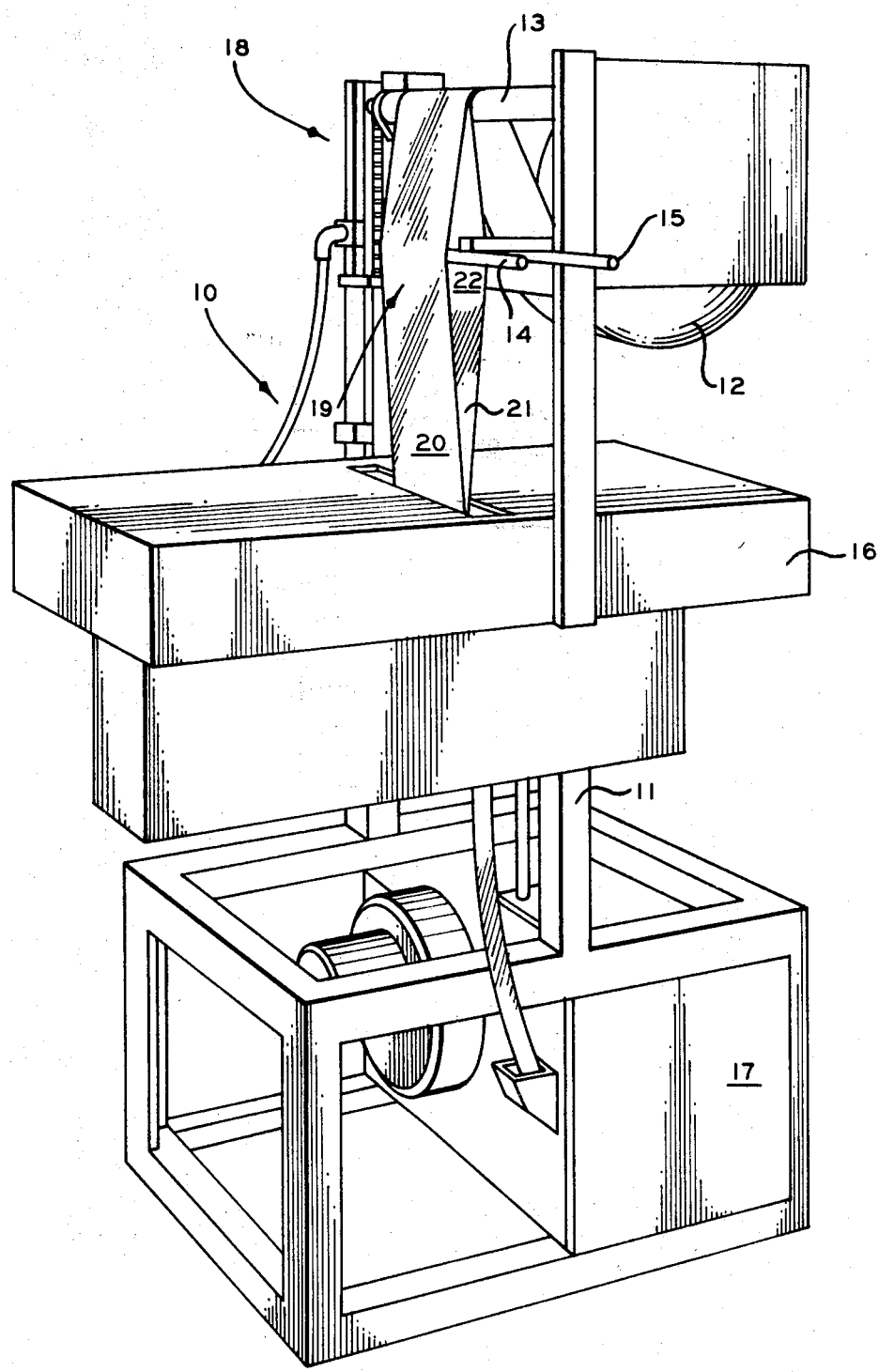
FIG. 1 is a perspective view of the bagging and packaging machine incorporating the unitized sealing and cutting assembly of this invention.

As shown in FIG. 1, a bagging and packaging machine 10 has a main chassis 11 for supporting the various components which include a supply roll 12 of thermoplastic film material, a feed roller 13, spreader rods 14 and 15, and a housing 16 which encloses the cutting and sealing assembly of this invention. The machine 10 may also be provided with a scrap box 17 and a drive means shown generally as 18 for intermittently advancing uniform and predetermined lengths of film material through the machine 10. The drive means 18 may also include a conventional feed roll clutch and brake (not shown) operative upon the film supply roll 12 during film advancement.

In practice then the centerfold film 19 is trained over the feed roller 13 which intermittently advances the film past the spreader rods 14 and 15 and thence through the cutting and sealing assemblies mounted in housing 16. In passing the spreader rods 14 and 15, the film 19 is spread into halves 20 and 21 providing an opening 22 for the insertion of the article to be packaged. Thus, an article inserted through the opening 22 is bound at the bottom by a sealed edge provided by the operation of the cutting and sealing assembly for the preceding package, and at the rear by the medial fold line. The cutting and sealing apparatus shown generally as 23 in FIG. 2 operates to seal the upper and front edges of the package and to sever the sealed package from the supply film.

The machine and assemblies of this invention may use any suitable thermoplastic material, such as one of the polyolefins including polyethylene, propylene, and the like.

While the components of the machine 10 have been described generally to set the environment for the unitized assembly of this invention, a more detailed description of these components is presented in U.S. Pat. 3,364,650, issued to House and dated Jan. 23, 1968.

Figure 2:
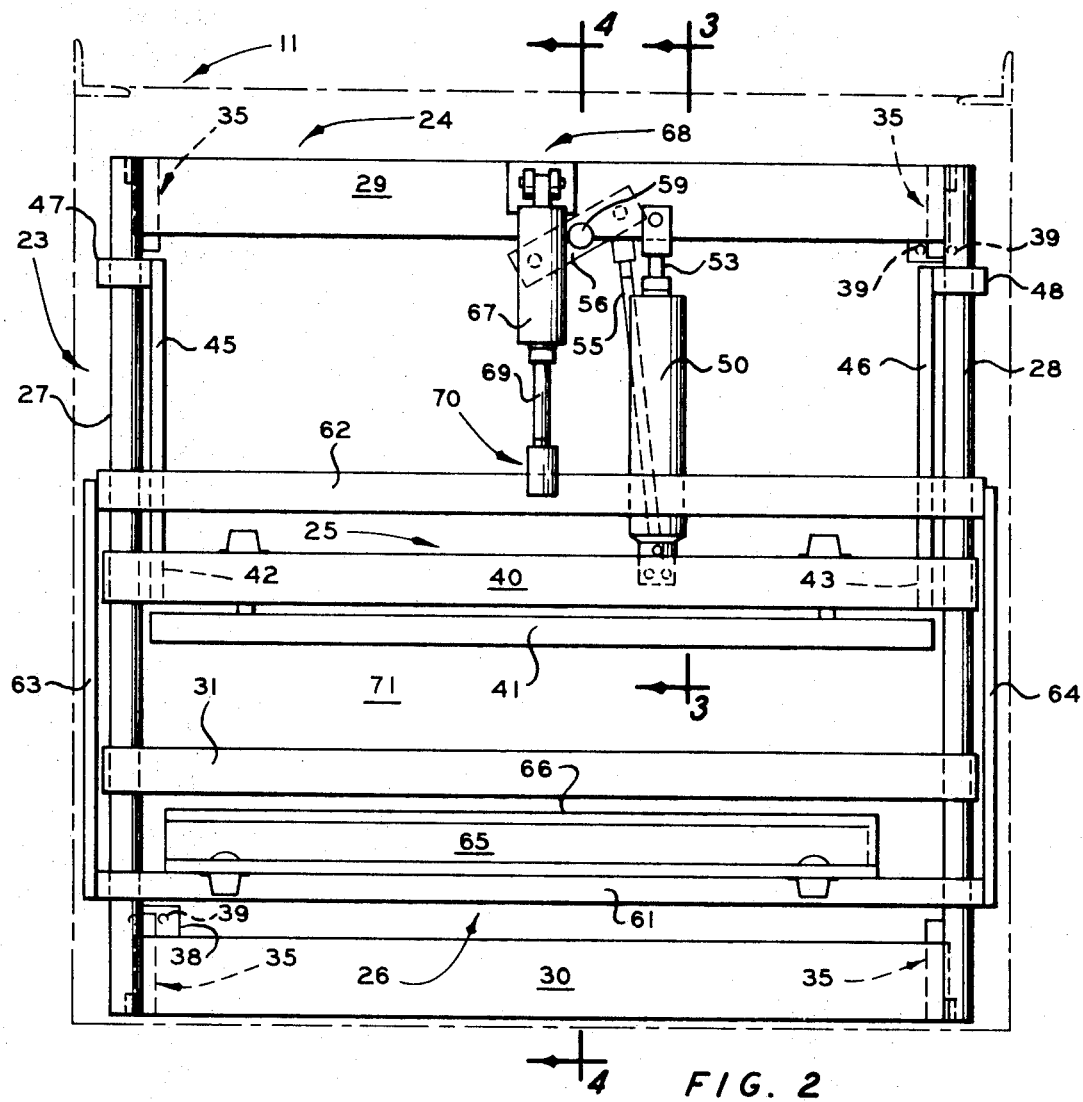
FIG. 2 is a plan view of the cutting and sealing assembly constructed according to this invention, and used in the machine shown in FIG. 1.

Now referring to FIGS. 2, 3 and 4, the unitized assembly 23 is seen to include a first frame 24, a second frame 25 slidably mounted on the first frame 24, and a third frame 26 slidably mounted on the first frame 24. The first frame 24 is a rectangular structure having a pair of laterally spaced rods 27 and 28 interconnected by cross members 29 and 30. Secured to an intermediate portion of the rods 27 and 28 and extending transversely across the frame 24 is a first gripping jaw 31 comprising transverse bars 32 and 33 separated by space 34.

The first frame 24 is movably mounted in the chassis 11 shown in phantom in FIG. 2 by means of roller assemblies 35 disposed at each corner of the frame 24. As best seen in FIG. 4, each roller assembly 35 includes a bar 36 depending from its respective cross member 29 or 30, and roller 37 journaled to the bar 36. Each of the rollers 37 is supported by coplanar brackets 38 secured to the main chassis 11. Thus, it is seen that the brackets 38 define a platform for rollably carrying the unitized cutting and sealing assembly 23. Diagonal brackets 38 are each provided with a pair of guide rollers 39 laterally spaced to engage opposite sides of their respective bar 36. The guide rollers 39 maintain the first frame 24 and hence the unitized assembly 23 in longitudinal alignment as the frame 24 is moved to and fro as described in detail below.

The second frame 25 includes a transversely extending platen 40 which yieldably carries a second gripping jaw 41. The outer ends of the platen 40 are secured to upright members 42 and 43 which are respectively slidably mounted on rods 27 and 28. Longitudinally extending bars 45 and 46 have their forward ends bolted or otherwise secured to the lower end of upright members 42 and 43, respectively, and extend rearwardly therefrom parallel to its corresponding rod 27 or 28. The rear extremity of the bars 45 and 46 are secured to collars 47 and 48 slidably mounted on rods 27 and 28, respectively. The first and second gripping jaws 31 and 41 are provided with complementary-shaped vertical wall portions 44 and 49, respectively, arranged in confronting relation. The wall portion 44 of the first gripping jaw 31 is vertically spaced so that the cutting knife may pass therethrough as described in detail below. The wall portion 49 of the second gripping jaw is separated by a recess 49a disposed for receiving the cutting edge of the cutting knife.

Figure 5:
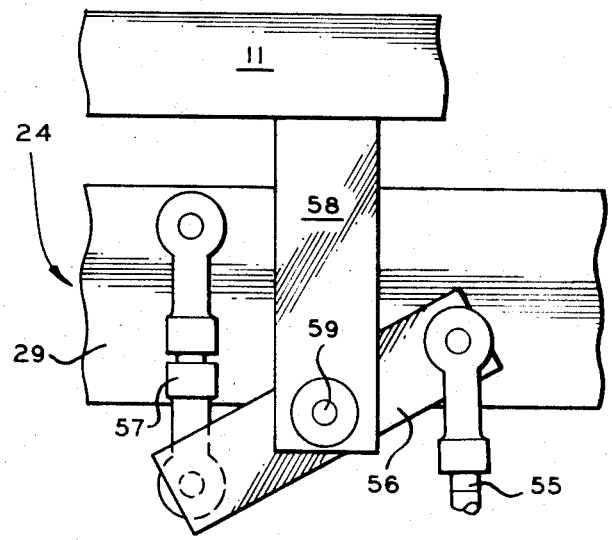
FIG. 5 is an enlarged fragmentary view of a portion of the assembly shown in FIG. 4 and as viewed from the plane indicated by line 5—5 thereof.

A pneumatic cylinder 50 anchored to a transverse bar 51 of the second frame 25 as shown at 52 in FIG. 3 has a piston rod 53 secured to the first frame cross member 29 as at 54. As best seen in FIGS. 2, 4 and 5, a linkage comprising a rod 55, lever 56, and a link 57 provides the means for moving the second frame 25 relative to the first frame 24 as the piston rod 53 is extended. The lever 56 is pivotally mounted on a bracket 58 secured to the main chassis 11 by means of a pin 59 depending from lever 56 and insertable into the complementary-shaped aperture 60 formed in the bracket 58. Link 57 interconnects the lever 56 and the first frame 24. Thus, as the piston rod 53 is extended from the cylinder 50 the second gripping jaw 41 is moved toward the center of the opening 71 closing the two jaws 31 and 41. Simultaneously through the linkage comprising rod 55, lever 56, and link 57 the first gripping jaw 31 is moved toward the center of the opening 71. At the end of the stroke of piston rod 53, the gripping jaw vertical wall portions 44 and 49 of each are arranged in abutting relation defining a holding zone for film disposed therein. The holding zone is vertically aligned with the feed roller 13 so that the film is fed in a straight line. The pin 59 provides a reaction base with the main chassis 11 so that the vertical wall portions 48 and 49 meet at the vertically aligned position relative to the feed roller 13.

The third frame 26 is a rectangular structure having crossbars 61 and 62 slidably mounted on rods 27 and 28 and having their ends interconnected by side rails 63 and 64. Bar 61 carries a cutting knife 65 which is provided with a transversely extending and tapered cutting edge 66. The cutting edge 66 is aligned with the opening 34 of the first gripping jaw 31 and the recess 49a of the second gripping jaw 41. The cutting edge 66 is moved through the holding zone defined by the vertical walls 44 and 49 of the first and second gripping jaws 31 and 41 by means of a second pneumatic cylinder 67. Cylinder 67 is anchored to the first frame 24 as shown at 68 and has a piston rod 69 attached to the third frame crossbar 62 as shown at 70. The piston rod 69 is normally extended and is retracted into cylinder 67 to drive the cutting edge 66 through the holding zone. After the gripping jaws 31 and 41 have been moved to the holding position, pneumatic flow is directed to the rod end of cylinder 67 to slidably move the third frame 26 along the first frame 24 thereby moving the knife 65 through the holding zone. The knife 65 is heated by conventional electrical means and in addition to cutting action welds wall halves of the film 19 together thereby enclosing the upper edge of the package. In order to close the front edge of the package the gripping jaws 31 and 41 and the knife 65 may be provided with vertically extending portions such as that disclosed in the aforementioned patent.

In operation, the film 19 is fed through the space separating the gripping jaws 31 and 41 disposed in the open position. The bottom edge of the film is sealed by the action of the unitized assembly for the previous package. After the article is placed in the film opening 22, the film 19 is advanced by drive means 18 wherein the film 19 is fed a predetermined amount moving the film portion and article below the holding zone. Next, the pneumatic cylinder 50 is actuated extending the piston rod 53 thereby conjointly moving the gripping jaws 31 and 41 to the holding position. The relative movement of the frames 24 and 25 is the same because the reaction base to the action of the cylinder 50 is provided by pin 59 anchored chassis 11. Thus, the gripping jaws 31 and 41 will always meet at the center line of the opening 44. The first frame 24 in being moved by the action of cylinder 50 carries the third frame 26 therewith so that the spacing of the knife 65 in relation to the first gripping jaw 31 remains the same. Finally, the pneumatic cylinder 67 is actuated retracting the piston rod 69 forcing the heated knife 65 through the holding zone. The pneumatic system for cylinders 50 and 67 may include conventional controls for returning the piston rods 53 and 69 to their home position. Thus, the cutting and sealing operation is performed in sequential steps comprising, first, gripping the film 19 and, second, cutting and sealing the gripped film 19. Conventional controls such as limit switches may be provided for effecting the sequential operation automatically. A particularly convenient means for effecting the automatic operation in the proper sequence can also be provided by particularly sizing the cylinders 50 and 67 so that rod 53 is completely extended before rod 69 begins retracting.

In summary, then, the unitized cutting and sealing assembly 23 comprises three correlated frames 24, 25 and 26 connected to the main chassis 11 only by pin 59. The unitized character of the assembly provides a quick replacement feature. For example, if the cutting and sealing assembly 23 is not performing properly, it is simply lifted out of the housing 16 and replaced by a new one. The machine shutdown time is then only a fraction of the time required for the nonunitized cutting and sealing assemblies presently used.

While this preferred embodiment has been described in particular detail, it should be emphasized that modifications and alterations may be made therein without departing from the scope and spirit of the invention as set forth in the appended claims.

What is claimed is:

1. In a bagging and packaging machine, a unitary sealing and cutting assembly for thermoplastic film material comprising: a first frame having a first gripping jaw; a second frame movably mounted on said first frame and having a second gripping jaw, said first and second gripping jaws being provided with complementary-shaped and aligned recesses; a first power means carried by said first and second frames having a pneumatic cylinder mounted on one of said first and second frames and having a piston rod secured to the other of said first and second frames, said cylinder being operative to move said first and second frames and associated first and second gripping jaws and a linkage interconnecting said first and second frames and having a lever pivotally anchored to said machine whereby said gripping jaws are movable like amounts toward and from one another relative to said machine between a film holding position and an open position, said gripping jaws in said holding position defining a holding zone wherein film disposed therebetween is restrained; a third frame slidably mounted on said first frame and having a cutting and sealing knife disposed in registry with said recesses; and a second power means carried by said first and third frames and operative to move said cutting and sealing knife through said holding zone thereby cutting and sealing said film restrained therein.

2. The invention as recited in claim 1 wherein said second power means includes a pneumatic cylinder mounted on one of said first and third frames and having a piston rod connected to the other of said first and third frames.

3. The invention as recited in claim 2 further comprising means for first actuating said first power means to move said gripping jaws in gripping relation on film disposed therebetween, and then actuating said second power means to move said knife in a cutting stroke to sever and seal said gripped film.

4. In a bagging and packaging machine of the type having a main chassis, a platform mounted on said chassis, means for intermittently advancing film longitudinally through an opening in said platform, the improvement comprising:
a first frame rollably mounted on said platform and having a first gripping jaw transversely disposed on one side of said film advanced through said opening, said first gripping jaw having an elongate opening extending therethrough;
a second frame slidably mounted on said first frame and having a second gripping jaw transversely disposed on the other side of said film advanced through said platform opening, said second gripping jaw being aligned with said first gripping jaw;
first power means interconnecting said first and second frames for moving said first gripping jaw into abutting relation with said second gripping jaw thereby restraining film disposed therebetween;
a third frame slidably mounted on said first frame and having a transversely extending knife in register with said first gripping jaw elongate opening; and
second power means interconnecting said first and third frames and actuable to move said knife through said elongate opening toward said second gripping jaw, said first, second, and third frames and associated power means being removable from said platform as a unit.

5. The invention as recited in claim 4 wherein said first power means includes pneumatic cylinder interconnecting said first and second frames, and a linkage interconnecting said first and second frames, said linkage including a lever pivotally anchored to said chassis, said anchor providing a reaction base for actuation of said cylinder so that movement of said gripping jaws is with reference to said chassis.

References Cited
UNITED STATES PATENTS

| | | | |
|---|---|---|---|
| 3,083,513 | 4/1963 | Cochrane | 53—182 |
| 3,340,129 | 9/1967 | Grevich | 53—182X |
| 3,449,888 | 6/1969 | Gausman | 53—182 |

THERON E. CONDON, Primary Examiner
E. F. DESMOND, Assistant Examiner

U.S. Cl. X.R.
53—182, 373